United States Patent [19]
Giusti

[11] 4,347,340
[45] Aug. 31, 1982

[54] METHOD FOR PREPARING THERMOELASTOMERIC THREE-BLOCK COPOLYMERS

[75] Inventor: Paolo Giusti, Pisa, Italy

[73] Assignee: Anic, S.p.A., Palermo, Italy

[21] Appl. No.: 250,925

[22] Filed: Apr. 6, 1981

[30] Foreign Application Priority Data

Apr. 10, 1980 [IT] Italy .................................. 21290 A/80

[51] Int. Cl.$^3$ ........................................... C08F 297/04
[52] U.S. Cl. ....................................... 525/249; 525/299
[58] Field of Search ............... 525/249, 314, 319, 321, 525/299; 526/185, 206, 226

[56] References Cited

U.S. PATENT DOCUMENTS

| | | | |
|---|---|---|---|
| 3,123,592 | 3/1964 | Gasparoni | 526/185 |
| 3,739,042 | 6/1973 | Chu | 525/299 |
| 3,994,993 | 11/1976 | Kennedy | 525/249 |
| 4,001,350 | 1/1977 | Fahrbach | 525/299 |
| 4,038,474 | 7/1976 | Kudo | 526/185 |
| 4,039,733 | 8/1977 | Kudo | 526/185 |
| 4,154,916 | 5/1979 | Wagensommer | 526/185 |
| 4,262,095 | 4/1981 | Giusti | 525/249 |
| 4,269,955 | 5/1981 | Wagensommer | 526/185 |

Primary Examiner—Paul R. Michl
Attorney, Agent, or Firm—Morgan, Finnegan, Pine, Foley & Lee

[57] ABSTRACT

A process is disclosed for producing thermoelastomeric 3-block copolymers of the ABA (or ABC) type, the end blocks being a plastomeric nature and the intermediate block of an elastomeric nature, by cationic polymerization employing a composite catalytic system comprised of Aluminium alkyl, possibly with a halogen substituent, and of a halogen or a halogen-substituted hydrocarbon radical.

11 Claims, No Drawings

METHOD FOR PREPARING THERMOELASTOMERIC THREE-BLOCK COPOLYMERS

This invention relates to an improved method for the preparation of elastomeric 3-block copolymers of the type ABA or ABC, wherein the blocks A and C are of a plastomeric nature and the blocks B are of an elastomeric nature.

The fields of use of the 3-block copolymers of this invention are those which are typical for the thermoplastic elastomers.

The elastomeric properties of the copolymers in question are due to the immiscibility of the polymers forming the blocks A (or C) and B. A material is thus obtained, which has a 2-phase structure, wherein the plastomeric units A and C play the role of cross-linking agents which reinforce the elastomeric lattice which makes up the central block.

Therefore, at room temperature, the copolymer ABA or ABC behaves like a cured rubber. By heating above the glassy transition temperature (in the case of an amorphous polymer) or the melting point temperature (in the case of a crystalline polymer) of the plastomeric phase A (or C), the material behaves like the conventional thermoplastics materials and can thus be processed according to the procedures appropriate for such materials.

The rigid units are restored in the subsequent cooling and the materials resume their elastomeric properties once again.

The advantages of a thermoplastic elastomer over the conventional rubbers are self-explanatory: reprocessability of spent materials, of scraps and rejects, the result being the preservation of the resources and the environment.

A few thermoplastic elastomers, as obtained by ionic polymerization procedures, entered the trade in the 70ies in the form of products obtained through the anionic route, in which the central block is generally polybutadiene or polyisoprene, and the end blocks are polysterene or variously substituted polystyrene.

Materials of such a nature, due to the insaturation which is present in the elastomeric phase, exhibit a poor resistance to oxidation and aging and must be stabilized by resorting to the use of additives, just as in the case of conventional rubbers.

The 3-block copolymers according to the present invention afford the considerable advantage that they have an elastomeric phase consisting of a saturated polymer and are thus inherently resistant to oxidation or aging.

Copolymers of this kind have been described in the U.S. patent Ser. No. 964.459 filed on Nov. 29, 1978, now U.S. Pat. No. 4,262,095, issued on Apr. 14, 1981. in the name of the same applicants hereof.

According to the application aforementioned, the compounds which can be used for the preparation of the blocks A and C are those which are conventionally used for obtaining plastomers by adopting a cationic-type polymerization run. They are selected from among those which display at least one unsaturation, preferably of the olefin type. Thus, they can be selected from among the class of unsaturated hydrocarbons which contain the olefin unsaturation in their chains and which possibly contain also substituents consisting of aliphatic saturated hydrocarbons, carbocyclic hydrocarbons or aromatic hydrocarbons. They can be selected, preferably, from among 3-methylbutene-1, styrene, alphamethylstyrene, alphaparadimethylstyrene, vinylnaphthene and others, for example.

The compounds which can be used for the production of the elastomeric block B can be selected from among isobutylene, its higher homologs and all those monomers which polymerize cationically to produce a saturated polymer having an elastomeric nature. These can be selected from among the butenes, pentenes, vinyl ethers and the like.

The polymerization process comprised the polymerization of the first plastomeric block in the presence of boron or aluminum halides, in the presence (or not) of co-catalytic amounts of isobutene. The second plastomeric block, after the addition of the isobutylene was polymerized in the presence of an aluminum compound having the formula $AlR_2X$, wherein X was equal to R or was a halogen, while R was hydrogen or a hydrocarbon radical containing up to 8 carbon atoms.

Such prior process was carried out in a heterogeneous phase, that which might have caused the lowering of the polymerization yields because the polymer was precipitated during the reaction and thus there was the possibility that catalyst residue might be occluded within the polymer mass so that their removal was extremely difficult. In addition, a Lewis acid other than the one used initially was to be employed to polymerize the third block.

The present applicant has now found that it is possible to obtain 3-block copolymers of the kind referred to above, while overcoming the drawbacks enumerated above, by working within a homogeneous system and resorting to the same catalyst system for all the polymerization stages.

The catalytic system in question consists of a compound of aluminum, (a), having the formula $AlR_2X'$ wherein both the radicals R are hydrogen atoms, or alkyl radicals equal or different and containing up to 8 carbon atoms, and X' is an atom of fluorine, bromine, chlorine or iodine, or a radical containing up to 8 carbon atoms, in union with a compound, (b), to be selected from among:

(1) $X_2''$ wherein $X''$ is a halogen equal to, or different from $X'$;

(2) $X''X'''$ wherein $X''$ is a halogen as defined above and $X'''$ is a halogen other than $X''$, and (3)

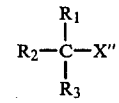

wherein $X''$ is a halogen, $R_1$ is hydrogen or an alkyl radical containing from 1 to 8 carbon atoms, an aromatic radical or an alkylene radical containing from 2 to 8 carbon atoms $R_3$ is hydrogen, an alkyl radical containing from 1 to 8 carbon atoms, an aromatic radical, an alkenyl radical containing from 2 to 8 carbon atoms or an aralkyl radical, and $R_2$ is an alkyl radical containing from 1 to 8 carbon atoms, an alkenyl radical containing from 2 to 8 carbon atoms, an aromatic radical, an aralkyl radical, an alkaryl radical, a cycloalkyl radical containing from 3 to 10 carbon atoms, or a group

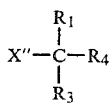

wherein $R_1$, $R_3$ and $X''$ are as hereinbefore defined and $R_4$ is an aromatic radical, an aralkyl radical or a methylene chain $-(CH_2)_n-$ wherein n is an integer from 1 to 10.

The polymerization procedure is carried out by polymerizing the monomer of the block A in the presence of the catalytic system aforementioned, adding, at the desired time, the monomer of the block B and finally completing the polymerization by the addition of the monomer of the third block (A or C). The reaction, as outlined above, takes place in a homogeneous phase and is carried out in the presence of a solvent selected from among the saturated aliphatic hydrocarbons, their halogen-substituted derivatives or admixtures thereof.

Exemplary solvents are nor.pentane, nor.hexane, nor.heptane, methyl chloride, methylene chloride, dichloroethane, ethyl chloride and others.

The mixture of methylene chloride and nor.heptane has proved to be especially suitable.

The reaction is carried out at a temperature comprised between $-20°$ C. and $-100°$ C., preferably between $-50°$ C. and $-80°$ C.

The molar ratio between the two components (a) and (b) of the catalytic system may be varied between 0.1:1 and 100:1 and the ratio is preferably selected between 1:1 and 10:1.

Without delving into details as to the times of addition of the monomers which make up the several blocks, or the mechanisms of the various reactions involved, the addition of the monomers which make up the several blocks is effected when the polymerization reaction of the previous block is almost over. The value of the conversion ratio or the time at which the individual monomers should be added, starting from the polymerization inception, may thus be selected by the skilled artisan consistently with the object aimed at and the properties which are desired for the end product.

A number of sets of tests have been carried out for polymerization and they are reported hereinafter by way of illustration only but without any implied limitation, to show the best mode to put the invention to practice and the most significant results which have been achieved.

The test polymerization runs have been carried out in an adiabatic calorimeter which was entirely made of glass and equipped with a magnetic stirrer, a platinum wire thermometer and a conductivity cell, both the latter being connected to a two-channel telemetric recorder. The calorimeter was connected to a vacuum pipeline by means of which it is dried and de-aerated. The adoption of this type of instrument permits to monitor the reaction during its entire progress throughout by taking conductivity and temperature readings as disclosed in the article by PRIOLA, FERRARIS, MAINA and GIUSTI on "Die Makromolekulare Chemie," Vol. 176, pages 2271-2228 (1975), so that the conversion ratio can be evaluated at every desired instant of time.

The apparatus in question is charged with the solvents, which, in the tests reported herein were always methylene chloride and nor.heptane in the vol/vol ratio of 1:1, then the catalytic system and, eventually, in the order given, the first plastomeric block, A, the elastomeric block, B, and the plastomeric block C (or A again). The addition of the monomers composing the second and the third block was effected when the conversion ratio of the monomer which constituted the block concerned was close to 100%. On completion of the polymerization of the last block, and after having maintained stirring for about 10 minutes as from the last addition, the reaction is discontinued by adding methanol to the reaction mass. The dry polymer which has been obtained was then fractionated in order to isolate the triple block because the polymerizate may contain, as impurities, small values of AB blocks and of homopolymers having a low molecular weight, as formed by side reactions. The extraction is carried out in a Soxhlet extractor, by effecting multiple extractions and using appropriate solvents, such as methylethylketone for the plastomeric phase and nor. alkanes for the elastomeric phase.

The polymers are then characterized by determining their intrinsic viscosities in toluene at 30° C. and their structures by differential thermal analysis (DSC) and infrared spectrometry (I.R.). The IR-spectra which have been obtained display the characteristic absorption bands of polystyrene (or of poly-alphamethylstyrene) and of polyisobutene. These spectra, moreover, are similar to those which are obtained starting from mixtures of the two homopolymers and do not differ a great deal from the spectrum of random copolymers having the same compositions. On the other hand, the procedure adopted for the fractionation excludes the possibility that the products being tested are composed by mixtures of the two homopolymers and, in addition, the polymerization kinetics clearly show that the samples cannot be random copolymers because isobutene is added when styrene (or alphamethylstyrene) is now nearly wholly polymerized.

Differential heat scannings have shown the glassy transitions which are typical for polyisobutene and the plastomeric blocks. The difference between the values which have been observed for the polyisobutene blocks (values ranging from $-67°$ C. to $-70°$ C.) and the value, reported by the literature, $-73°$ C. (see Polymer Handbook, 2nd Edition, J. Brandrup E. H. Ummergut Editors, John Wiley and Sons, Inc. New York, 1975, Chapter III) can be attributed to possible differences in the measurement methods and also to intermolecular or intramolecular interactions between the elastomeric and the plastomeric blocks of the block copolymer. The second transitions can clearly be attributed to the plastomeric blocks in the case of the ABA triple blocks, even if they are slightly lower than those reported in the literature and the seeming discrepancy can be explained by reasons very much akin to those set forth above.

In the case of block copolymers of the type ABC, polystyrene-polyisobutene-polyalphamethylstyrene, glassy transition has been observed at $-67°$ C., which can clearly be attributed to the polyisobutylene block and also a single glassy transition has been seen at $+126°$ C. The latter can be associated with the existence of a single glassy phase consisting of a mixture of blocks of polystyrene and poly-alphamethylstyrene, in agreement with that which has been described by the literature (R. E. Cunningham, J. Appl. Pol. Sci., 22, page 2387 (1978): as a matter of fact, polystyrene and poly-alphamethylstyrene are mutually soluble in one another.

The thermoelastomeric nature of the products thus obtained has subsequently been confirmed by mechanical tests (tensile strength and elongation at break).

In the attached TABLES, there are reported the reaction conditions, the yields of triple blocks and the properties of the products which have been obtained in the several polymerization tests which have been carried out in a homogeneous phase according to the process of this invention, the catalysts which have been used being: AlEthyl$_2$Cl (component a) and Cl$_2$ or tert-.butyl chloride (component b). There have been produced triple blocks of polystyrene-polyisobutene-polystyrene (ABA); polyalphamethylstyrene-polyisobutene-polyalphamethylstyrene (ABA), and polystyrene-polyisobutene-polyalphamethylstyrene (ABC).

TABLE 1

SUMMARY REPORT OF THE POLYMERIZATION TEST RUNS.

| | Catalytic system | | Monomers of the Blocks | | | | Yield | | | |
|---|---|---|---|---|---|---|---|---|---|---|
| Run No | b mol/liter | a mol/liter | I (A) mol/liter | II (B) mol/liter | III (A or C) mol/liter | Temp. °C. | 3.block % | η dl/g | T$_{gA}$ °C. | T$_{gB}$ °C. |
| | Cl$_2$ | AlEt$_2$Cl | Styr. | Isobut. | Styr. | | | | | |
| 1 | 9·10$^{-4}$ | 1.5·10$^{-3}$ | 0.18 | 0.13 | 0.13 | −50 | 40 | 0.42 | 86 | −70 |
| 2 | " | " | 0.18 | 0.26 | 0.13 | −50 | 60 | 0.57 | 85 | −65 |
| 3 | " | " | 0.18 | 0.13 | 0.26 | −50 | 35 | 0.35 | 90 | −68 |
| 4 | " | " | 0.18 | 0.13 | 0.13 | −60 | 48 | 0.60 | 87 | −70 |
| 5 | " | " | 0.18 | 0.13 | 0.13 | −70 | 68 | 0.68 | 90 | −72 |
| | ter.but.Cl | AlEt$_2$Cl | | | | | | | | |
| 6 | 9·10$^{-4}$ | 1,5·10$^{-3}$ | 0.18 | 0.13 | 0.13 | −50 | 50 | 0.58 | 85 | −70 |
| 7 | " | " | 0.18 | 0.26 | 0.13 | −50 | 71 | 0.71 | 85 | −68 |
| 8 | " | " | 0.18 | 0.13 | 0.26 | −50 | 43 | 0.53 | 90 | −68 |
| 9 | " | " | 0.18 | 0.13 | 0.13 | −60 | 59 | 0.64 | 90 | −70 |
| 10 | " | " | 0.18 | 0.13 | 0.13 | −70 | 80 | 0.80 | 92 | −70 |
| | | | α-methyl stir | Isobut. | α-methyl stir | | | | | |
| 11 | " | 1,4·10$^{-3}$ | 0.21 | 0.14 | 0.14 | −70 | 75 | 0.73 | 157 | −68 |
| 12 | " | " | 0.20 | 0.14 | 0.14 | −70 | 80 | 0.76 | 126 | −67 |

η = intrinsic viscosity mol wt in toluene at 30° C.
T$_{gA}$ = glassy transition temperature of the plastomeric block
T$_{gB}$ = glassy transition temperature of the elastomeric block To evaluate the elastomeric properties of the products which have been obtained, tensile tests have been carried out on a few of them.

There have been tested the 3-block polymers styrene-isobutene-styrene and alphamethylstyrene-isobutene-alphamethylstyrene of Test Runs 10 and 11.

Samples have been molded with these two products at 180° C. and the samples have been subjected to tensile tests according to the DIN-53504 (die S3) standards at room temperature to determine the tensile strength and the elongation at break.

The same determinations under the same conditions have been performed on mechanical mixtures of the individual homopolymers (polystyrene and polyisobutene; and polyalphamethylstyrene plus polyisobutene, respectively), using the same respective molar ratios as existing in the 3-blocks.

The results are tabulated in the attached TABLE 2.

TABLE 2

TENSILE TESTS

| | Run 10 | Run 11 | Mechanical mixture corresp. to Run 10 | Mechanical mixture corresp. to Run 11 |
|---|---|---|---|---|
| Tensile strength, MPa | 18 | 24 | 0.71 | 0.68 |
| Elongation at break, % | 650 | 710 | 810 | 790 |

It is apparent that, on the basis of the values which have been obtained, especially those of the tensile strength, the samples of Runs 10 and 11 of TABLE 1 hereof are satisfactory thermoelastomers, whereas the corresponding mere mechanical mixtures do not possess corresponding or similar properties.

I claim:

1. A process for the preparation of three-block copolymers of the ABA or the ABC type wherein the blocks A and C are of a plastomeric nature and the block B is of an elastomeric nature, comprising the steps of effecting the sequential polymerization of the monomers relative to the first plastomeric block, the elastomeric block and the second plastomeric block in the order given, in the presence of a catalytic system comprised of:

(a) a compound of aluminum having the formula AlR$_2$X', wherein both the radicals R are hydrogen atoms, or alkyl radicals, equal or different, containing up to 8 carbon atoms, and X' is an atom of fluorine, chlorine, bromine or iodine, or a radical containing up to 8 carbon atoms, and (b) a compound selected from the group consisting of:

(1) X$_2$" wherein X" is a halogen equal to, or different from, X';

(2) X"X'" wherein X" is a halogen as defined above and X'" is a halogen other than X", and (3) a group

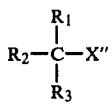

wherein
- X" is a halogen,
- $R_1$ is a member selected from the group consisting of hydrogen, an alkyl radical containing from 1 to 8 carbon atoms, an aromatic radical, an alkenyl radical containing from 2 to 8 carbon atoms,
- $R_3$ is a member selected from the group consisting of hydrogen, an alkyl radical containing from 1 to 8 carbon atoms, an aromatic radical, an alkenyl radical containing from 2 to 8 carbon atoms, and an aralkyl radical, and
- $R_2$ is a member selected from the group consisting of an alkyl radical containing from 1 to 8 carbon atoms, an alkenyl radical containing from 2 to 8 carbon atoms, an aromatic radical, an aralkyl radical, an alkaryl radical, a cycloalkyl radical containing from 3 to 10 carbon atoms, and a group

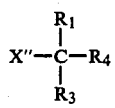

wherein $R_1$, $R_3$ and X" are as hereinbefore defined and $R_4$ is a member selected from the group consisting of an aromatic radical, an aralkyl radical and a methylene chain $-(CH_2)_n-$ wherein n is an integer comprised between 1 and 10.

2. A process for the preparation of 3-block copolymers according to claim 1, characterized in that the polymerization reactions take place in the presence of the catalytic system in which the constituents are in the ratio of (a) to (b) variable between 0.1:1 and 100:1.

3. A process for the preparation of 3-block copolymers according to claim 2, characterized in that the ratio between the components of the catalytic system preferably varies between 1:1 and 10:1.

4. A process for the preparation of 3-block copolymers according to claim 1, 2 or 3 characterized in that the polymerization reactions are carried out in the presence of a solvent which is a member selected from the group consisting of the saturated aliphatic hydrocarbons, their halogen-substituted derivatives and mixtures thereof.

5. A process for the preparation of 3-block copolymers according to claim 4, characterized in that the polymerization reactions are preferably effected in the presence of a solvent consisting of a mixture of methylene chloride and normal heptane.

6. A process for the preparation of 3-block copolymers according to claim 1, 2 or 3 characterized in that the polymerization reactions are effected at a temperature comprised between minus 20° C. and minus 100° C.

7. A process for the preparation of 3-block copolymers according to claim 6, characterized in that the polymerization reactions are carried out at a temperature preferably selected in the range between minus 50° C. and minus 80° C.

8. A process for the preparation of 3-block copolymers according to claim 7, wherein A and C are polymer blocks of monomers which preferably have in their molecule an olefin unsaturation.

9. A process for the preparation of 3-block copolymers according to claim 1, 2 or 3, wherein A is a polymer block of styrene and C is a polymer block of alphamethylstyrene.

10. A process for the preparation of 3-block copolymers according to claim 1, 2 or 3 wherein A is a polymer block of alphamethylstyrene.

11. A process for the preparation of 3-block copolymers according to claim 1, 2 or 3 wherein B is a polymer block of isobutene.

* * * * *